(12) United States Patent
Chen

(10) Patent No.: US 12,419,429 B2
(45) Date of Patent: Sep. 23, 2025

(54) BED FRAME ASSEMBLY

(71) Applicant: House & Home Co., Ltd., Fujian (CN)

(72) Inventor: Xusheng Chen, Fujian (CN)

(73) Assignee: House & Home Co., Ltd., Fujian (CN)

( * ) Notice: Subject to any disclaimer, the term of this patent is extended or adjusted under 35 U.S.C. 154(b) by 147 days.

(21) Appl. No.: 18/516,978

(22) Filed: Nov. 22, 2023

(65) Prior Publication Data
US 2024/0081547 A1   Mar. 14, 2024

(51) Int. Cl.
*A47C 19/00* (2006.01)
*A47C 19/02* (2006.01)
*F16B 7/18* (2006.01)

(52) U.S. Cl.
CPC .......... *A47C 19/005* (2013.01); *A47C 19/022* (2013.01); *A47C 19/025* (2013.01); *F16B 7/182* (2013.01)

(58) Field of Classification Search
CPC ... A47C 19/005; A47C 19/022; A47C 19/025; A47C 19/024; A47C 19/021; F16B 7/182; F16B 12/50; F16B 12/30; F16B 2012/403; F16B 2012/406; F16B 2012/40
See application file for complete search history.

(56) References Cited

U.S. PATENT DOCUMENTS

| | | | | |
|---|---|---|---|---|
| 959,093 | A | * | 5/1910 | Wilson ................... F16B 12/54 5/283 |
| 1,259,022 | A | * | 3/1918 | Kean ...................... A47C 19/04 5/183 |
| 4,679,261 | A | * | 7/1987 | Stanley .................. A47C 19/04 5/183 |
| 4,754,506 | A | * | 7/1988 | Yeh ........................ F16B 12/30 403/205 |
| 2013/0139314 | A1 | * | 6/2013 | Chung ................. A47C 19/005 5/400 |
| 2019/0021508 | A1 | * | 1/2019 | Jewett .................. A47C 19/005 |
| 2020/0375367 | A1 | * | 12/2020 | Qiu ...................... A47C 19/005 |
| 2021/0071700 | A1 | * | 3/2021 | Zanette .................... F16B 7/02 |
| 2021/0127846 | A1 | * | 5/2021 | Chen .................... A47C 19/022 |

* cited by examiner

*Primary Examiner* — Matthew Troutman
*Assistant Examiner* — Alison N Labarge
(74) *Attorney, Agent, or Firm* — Birchwood IP

(57) ABSTRACT

A bed frame assembly, having four bed feet, two transverse support frames, and two longitudinal support frames; each bed foot is connected with one corresponding transverse support frame and one corresponding longitudinal support frame. At least one connection bar piece is arranged on each of a first side and a second side of each transverse support frame, and the connection bar piece is inserted to a corresponding bed foot and is locked by a corresponding fastener, so that the transverse support frame is more convenient and faster to assemble. The bed frame can be disassembled into the bed feet, the transverse support frames and the longitudinal support frames, which facilitates packaging and transportation.

8 Claims, 7 Drawing Sheets

BED FRAME ASSEMBLY

BACKGROUND OF THE INVENTION

The present invention relates to the technical field of bed frames, and in particular to a bed frame assembly.

With the rapid development of logistics and online shopping, many consumers purchase furniture such as bed frames by themselves. In order to facilitate the transportation of bed frames, bed frames are mostly disassembled into separate components which may be assembled later again. An existing bed frame is either disassembled into many small pieces, or disassembled in lesser pieces. In the former case, it is more convenient for packaging and transportation, but it is more difficult for consumers to arrange all the small pieces in an organized manner, and assembly is thus troublesome. In the latter case, assembly will become easier, but it is unfriendly to packaging and transportation.

BRIEF SUMMARY OF THE INVENTION

The present invention aims to provide a bed frame assembly which is convenient to assemble and easy to transport.

To attain the above objects, the present invention provides the following technical solutions:

A bed frame assembly, comprising four bed feet, two transverse support frames, and two longitudinal support frames; each of the bed feet is connected with one end of one corresponding transverse support frame and one end of one corresponding longitudinal support frame; the bed feet, the transverse support frames and the longitudinal support frames form a bed frame; wherein at least one connection bar piece is provided to each of a first side and a second side of each of the transverse support frames; said first side and said second side are opposite sides; each of the bed feet is provided with at least one mounting hole each corresponding to a corresponding connection bar piece; one end of each connection bar piece is connected to a corresponding transverse support frame, and another end of each connection bar piece is inserted into a corresponding mounting hole; said another end of each connection bar piece is provided with a fastener, and the fastener penetrates through a corresponding bed foot and is connected to the connection bar piece.

The fastener is a screw; at least one through hole through which each corresponding screw penetrates is formed on each of the bed feet; the through hole is in communication with a corresponding mounting hole, a screw hole corresponding to a corresponding screw is formed inside each of the two ends of each connection bar piece.

The present invention also comprises decorative sleeves each corresponding to a corresponding connection bar piece; each decorative sleeve sleeves the corresponding bed foot, and each decorative sleeve is provided with an inserting hole through which a corresponding fastener penetrates.

The present invention also comprises decorative bars each corresponding to each of the transverse support frames; each end of each decorative bar is inserted into the corresponding bed foot; and each end of each decorative bar is recessed with a receding groove to allow a corresponding connection bar piece to pass through, and is also provided with a penetrating hole for a corresponding fastener to pass through.

Both the decorative bars and the bed feet have a tubular shape, and each end of each decorative bar is reduced in diameter to form an insertion part, and the insertion part is inserted into a tubular cavity of the corresponding bed foot.

The present invention also comprises a reinforcing support frame and a plurality of vertical bars; one end of each vertical bar is connected to the reinforcing support frame, and another end of each vertical bar is flush with bottom ends of the bed feet; the reinforcing support frame comprises at least one longitudinal reinforcing bar and at least two transverse reinforcing bars; one end of each transverse reinforcing bar is connected to one of the longitudinal support frames, and another end of each transverse reinforcing bar is connected to another one of the longitudinal support frames; the longitudinal reinforcing bar is connected to all the transverse reinforcing bars.

The present invention also comprises a plurality of cross bars; the cross bars are disposed at equal intervals along a longitudinal direction of the longitudinal support frames; one end of each cross bar is connected to one of the longitudinal support frames, and another end of each cross bar is connected to another one of the longitudinal support frames.

The longitudinal support frames are provided with connection holes corresponding to the cross bars respectively; two ends of each cross bar are inserted into corresponding connection holes; each end of each cross bar is provided with a limiting part, and a positioning groove is formed between the limiting part and a corresponding end of the cross bar; each of the connection holes comprises a mounting part which the limiting part of a corresponding cross bar is inserted into, and a positioning part corresponding to the positioning groove of the corresponding cross bar; the mounting part and the positioning part of each connection hole are in communication with each other.

An end cap is detachably connected to the corresponding connection hole to limit movement of a corresponding end of the corresponding cross bar.

By using the technical solutions as detailed above, at least one connection bar piece is provided on each of the first side and the second side of each of the transverse support frames, and the connection bar piece is inserted to a corresponding bed foot and is locked by a corresponding fastener, so that the transverse support frame is more convenient and faster to assemble and has a better aesthetic appeal. The bed frame can be disassembled into the bed feet, the transverse support frames and the longitudinal support frames, which facilitates packaging and transportation.

The transverse support frames serving as the headboard and footboard are each provided with a decorative bar, and each end of the decorative bar is also locked by the same fastener locking the corresponding bed foot and the corresponding connection bar piece, and this further facilitates the assembly and disassembly of the bed frame.

Figure 1:
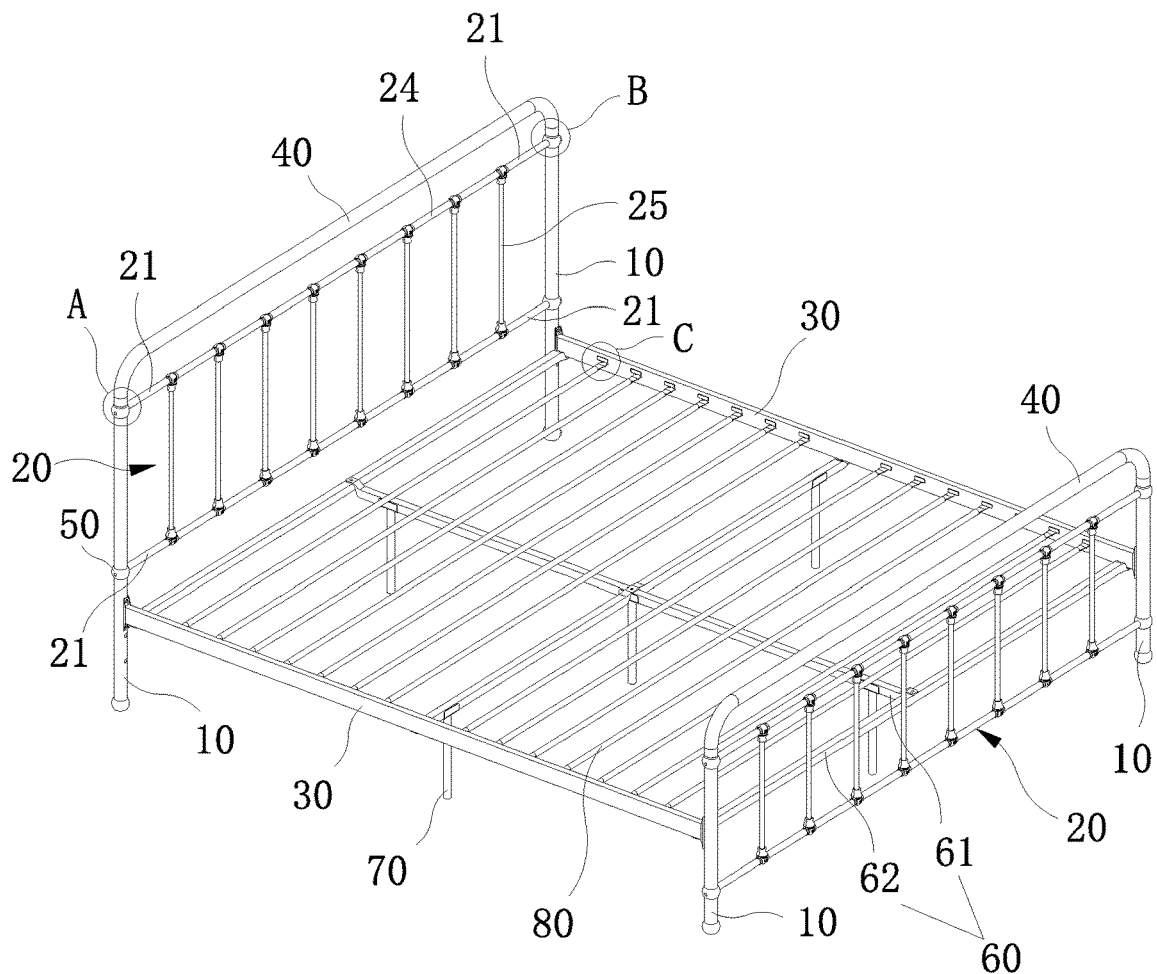
FIG. 1 is a schematic diagram of the present invention.
Figure 2:
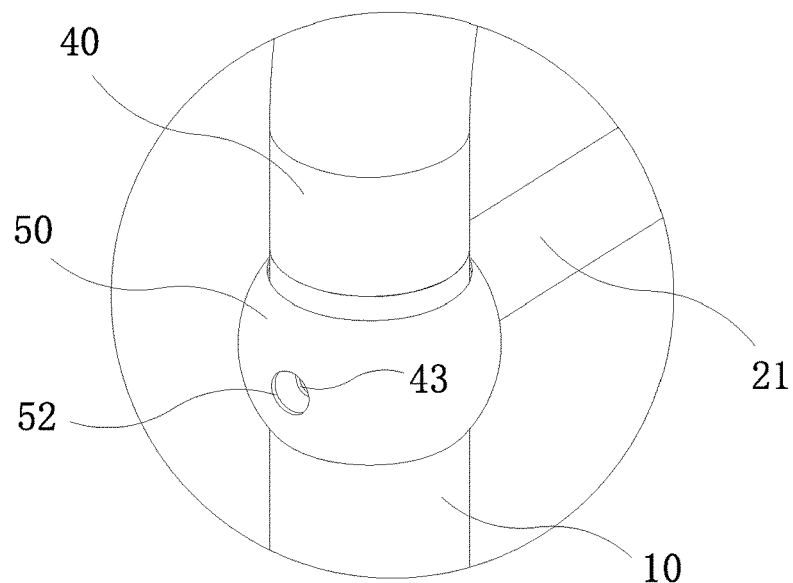
FIG. 2 is an enlarged schematic diagram of portion A in FIG. 1 (fastener omitted in the figure).
Figure 3:
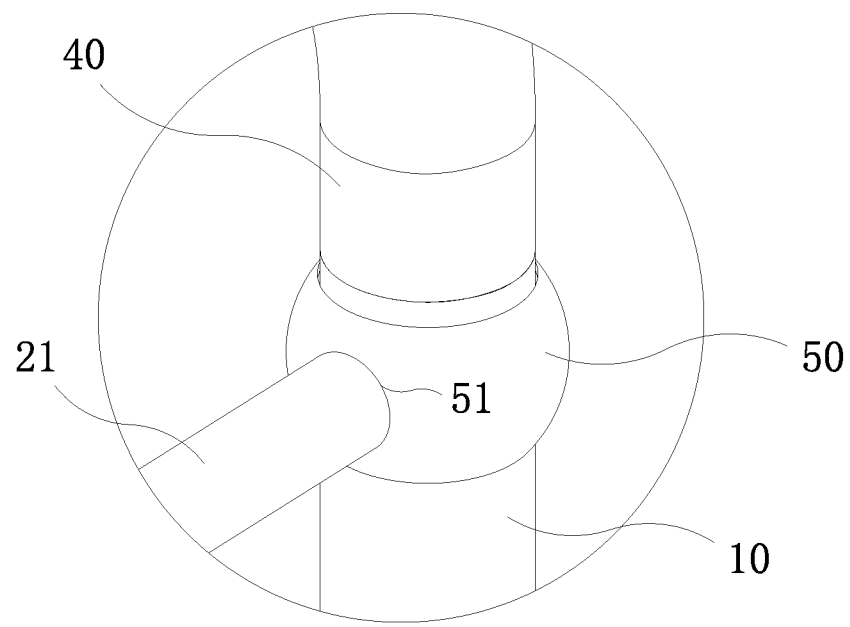
FIG. 3 is an enlarged schematic diagram of portion B in FIG. 1.
Figure 4:
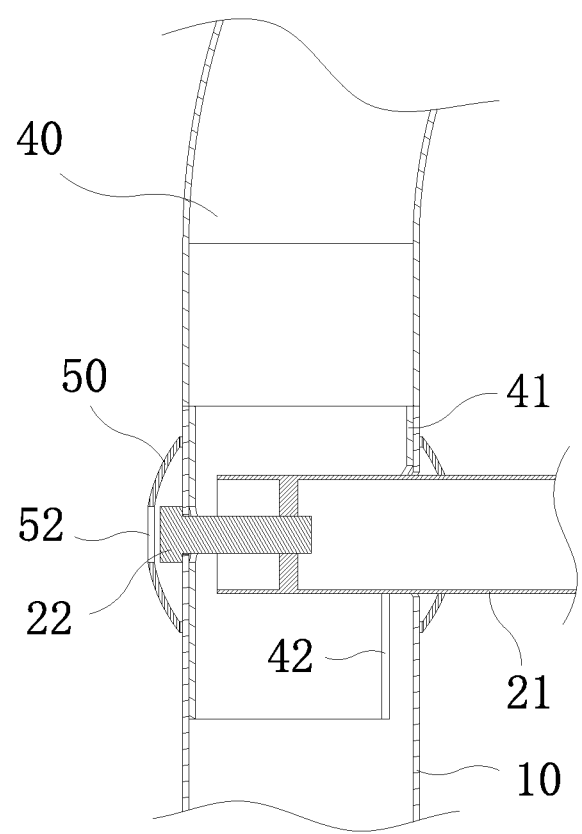
FIG. 4 is a sectional diagram showing connection of a bed foot, a connection bar piece and a decorative bar.
Figure 5:
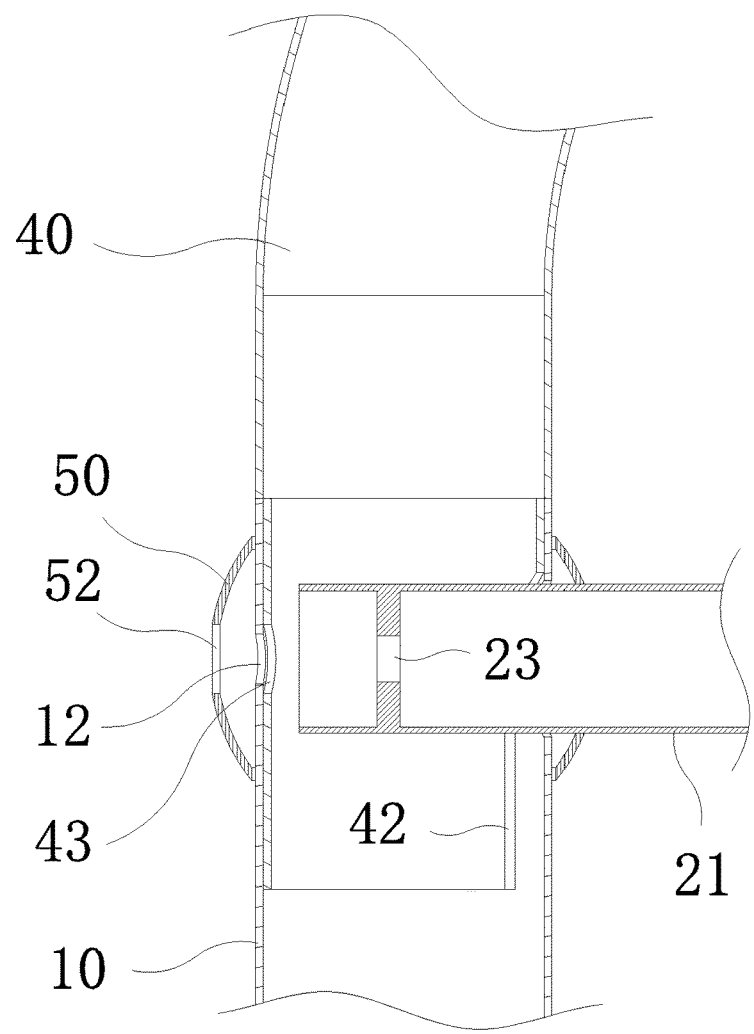
FIG. 5 is a schematic diagram of FIG. 4 with the fastener omitted.
Figure 6:
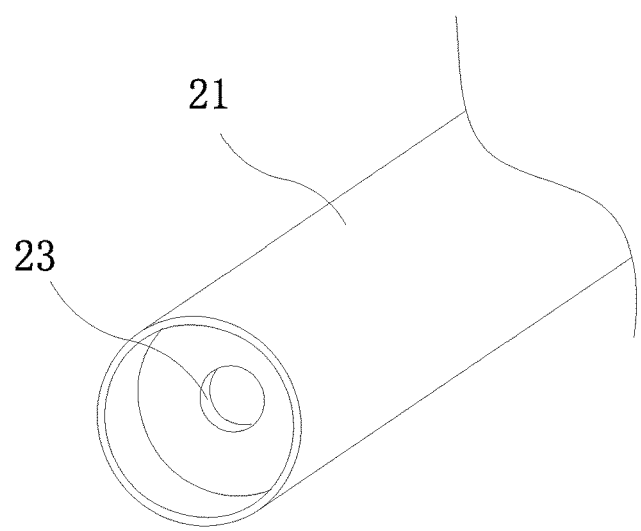
FIG. 6 is a schematic diagram of a connection bar piece.
Figure 7:
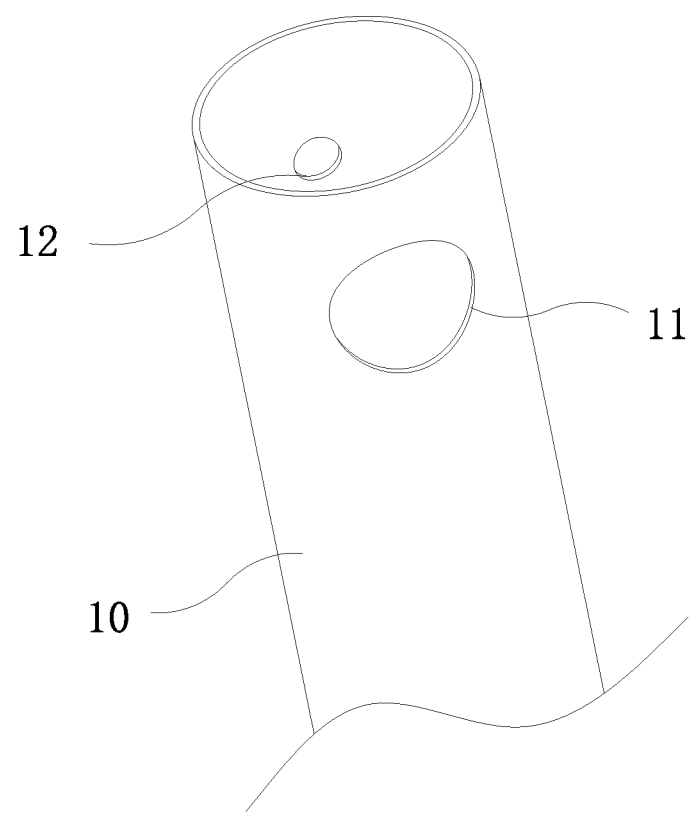
FIG. 7 is a partial schematic diagram of a bed foot.
Figure 8:
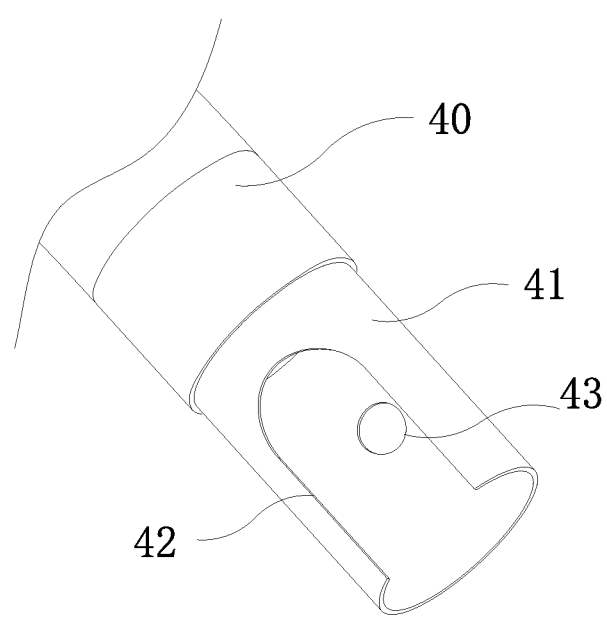
FIG. 8 is a schematic diagram of an end of a decorative bar.
Figure 9:
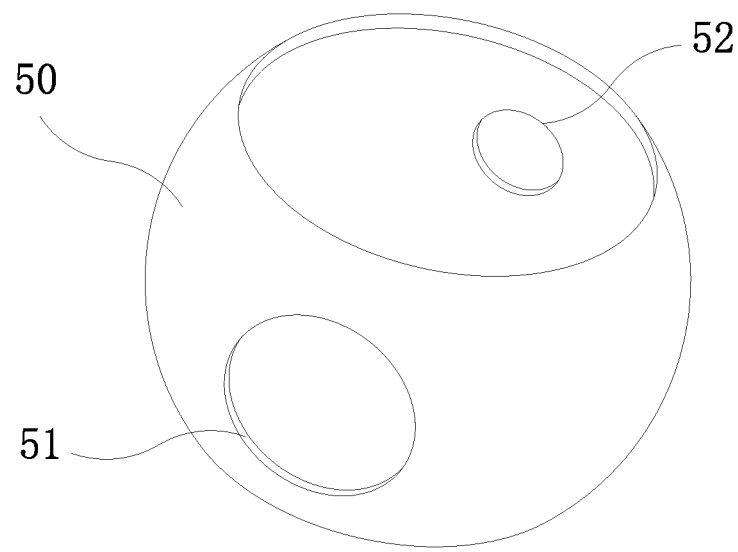
FIG. 9 is a schematic diagram of a decorative sleeve.
Figure 10:
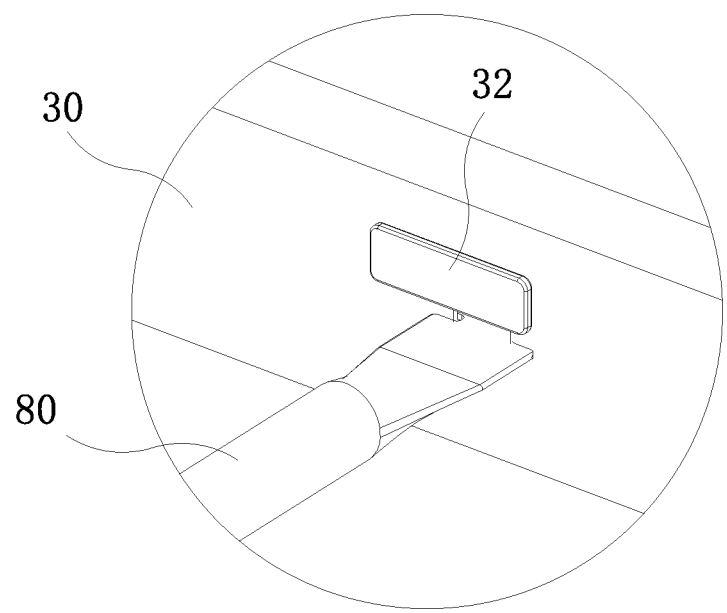
FIG. 10 is an enlarged schematic diagram of portion C in FIG. 1.
Figure 11:
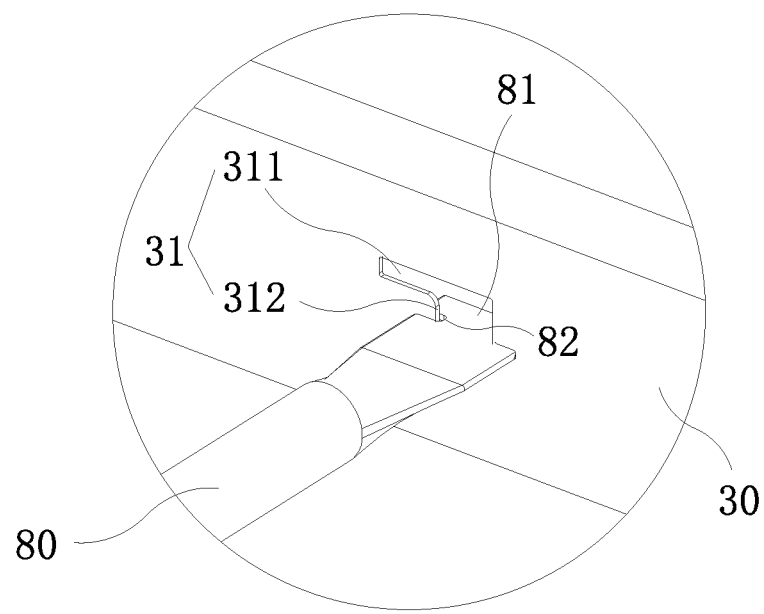
FIG. 11 is a schematic diagram of FIG. 10 with an end cap omitted.
Figure 12:
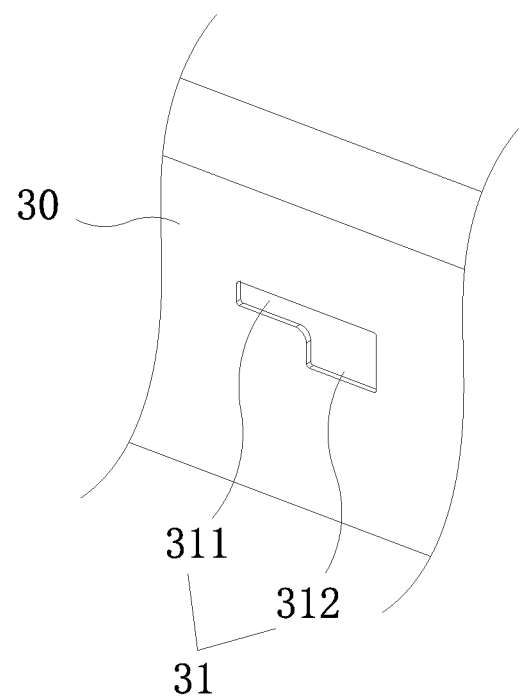
FIG. 12 is a partial schematic diagram of a longitudinal support frame.
Figure 13:
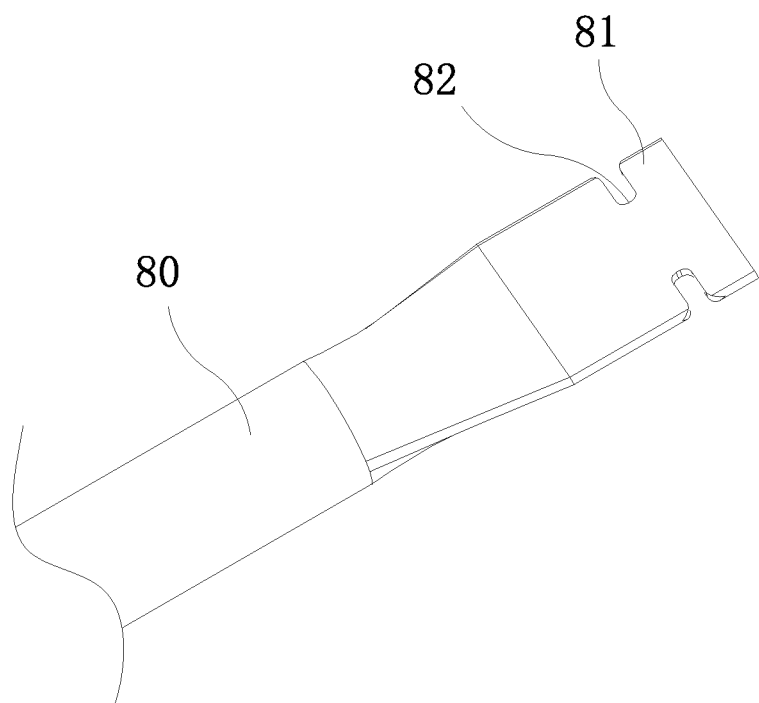
FIG. 13 is a schematic diagram of an end of a cross bar.
Figure 14:
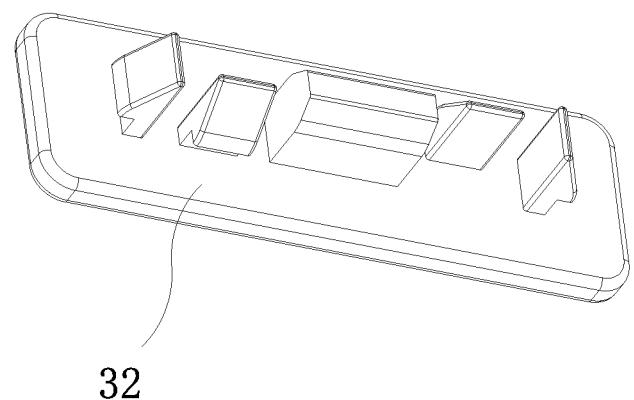
FIG. 14 is a schematic diagram of an end cap.

DESCRIPTION OF REFERENCE NUMERALS bed foot 10, mounting hole 11, through hole 12;
transverse support frame 20, connection bar piece 21, fastener 22, screw hole 23; horizontal rod 24; vertical rod 25;
longitudinal support frame 30, connection hole 31, mounting part 311, positioning part 312, end cap 32;
decorative bar 40, insertion part 41, receding groove 42, penetrating hole 43;
decorative sleeve 50, inserting hole 51, opening 52;
reinforcing support frame 60, longitudinal reinforcing bar 61, transverse reinforcing bar 62;
vertical bar 70; and
cross bar 80, limiting part 81, positioning groove 82.

DETAILED DESCRIPTION OF THE INVENTION

As shown in FIGS. 1-14, the present invention discloses a bed frame assembly, comprising four bed feet 10, two transverse support frames 20, two longitudinal support frames 30, a reinforcing support frame 60 and a plurality of cross bars 80, wherein each of the bed feet 10 is connected with one end of one corresponding transverse support frame 20 and one end of one corresponding longitudinal support frame 30; the bed feet 10, the transverse support frames 20 and the longitudinal support frames 30 form a bed frame. In the present invention, the two transverse support frames 20 are used as a headboard and a footboard of the bed frame respectively; each of the transverse support frames 20 is provided with a decorative bar 40. The longitudinal support frames 30 are arranged at two longitudinal sides of the bed frame, the longitudinal support frames 30 are used as force bearing components, and preferably, the longitudinal support frames 30 are directly locked with corresponding bed feet 10 through a plurality of bolts so as to ensure connection strength.

At least one connection bar piece 21 is provided on each of a first side and a second side of each of the transverse support frames 20 to ensure mounting stability of the transverse support frames 20, wherein said first side and said second side are opposite sides, and one end of each connection bar piece 21 is connected to a corresponding transverse support frame 20. Specifically, as shown in FIG. 1, each of the transverse support frames 20 is formed by two horizontal rods 24 and eight vertical rods 25, wherein the two horizontal rods 24 are parallel and spaced apart from each other, two ends of each of the eight vertical rods 25 are connected to the two horizontal rods 24 respectively, and all the eight vertical rods 25 are also parallel to one another and spaced apart from one another by a same distance along a lengthwise direction of the two horizontal rods 24. Accordingly, the transverse support frame 20 has a simple structure. In the present invention, each connection bar piece 21 is an extension from one end of a corresponding horizontal rod 24, and preferably, each connection bar piece 21 is integrally formed with the corresponding horizontal rod 24. Therefore, in the present embodiment as shown in FIG. 1, the first side of each of the transverse support frames 20 (i.e. a left side when viewing from the headboard towards the footboard of the bed) has two connection bar pieces 21, and the second side of each of the transverse support frames 20 (i.e. right side when viewing from the headboard towards the footboard of the bed) also has two connection bar pieces 21. Each of the bed feet 10 is provided with at least one mounting hole 11 each corresponding to a corresponding connection bar piece 21, and another end of the connection bar piece 21 (i.e. an end of the connection bar piece that is not connected to the corresponding transverse support frame 20) is inserted in the mounting hole 11 and fixed to a fastener 22, wherein the fastener 22 penetrates through a corresponding bed foot 10 and is connected to the connection bar piece 21. Preferably, the fastener 22 is a screw; at least one through hole 12 for each corresponding screw to penetrate through is formed on each of the bed feet 10; the through hole 12 is in communication with a corresponding mounting hole 11, a screw hole 23 corresponding to a corresponding screw is formed inside said another end of each connection bar piece 21, and a screw rod part of each screw penetrates through a corresponding through hole 12 to enter the corresponding bed foot 10 and is then in threaded connection with a corresponding screw hole 23, so that said another end of a corresponding connection bar piece 21 is locked.

In order to conveniently and rapidly assemble and disassemble the bed frame, each end of each decorative bar 40 is locked with a corresponding bed foot 10 by the same fastener 22 provided for said another end of each connection bar piece 21. Specifically, each end of each decorative bar 40 is inserted into the corresponding bed foot 10. Preferably, both the decorative bars 40 and the bed feet 10 have a tubular shape, and each end of each decorative bar 40 is reduced in diameter to form an insertion part 41, and the insertion part 41 is inserted into a tubular cavity of the corresponding bed foot 10. The insertion part 41 is recessed with a receding groove 42 to allow a corresponding connection bar piece 21 to pass through, and is also provided with a penetrating hole 43 for a corresponding fastener 22 to pass through. When said another end of each connection bar piece 21 of a corresponding transverse support frame 20 is inserted into a corresponding mounting hole 11, the insertion part 41 at a corresponding end of a corresponding decorative bar 40 can be inserted into an upper end of the corresponding bed foot 10, wherein the receding groove 42 is passed through by the connection bar piece 21. Further, the penetrating hole 43 and a corresponding through hole 12 are aligned, and the corresponding fastener 22 sequentially penetrates through the through hole 12 and the penetrating hole 43 and is then connected to the corresponding screw hole 23.

In order to hide a connection joint between each bed foot 10 and the corresponding connection bar piece 21 and improve the aesthetic appeal of the bed frame, a decorative sleeve 50 is provided for each connection bar piece 21, wherein each decorative sleeve 50 sleeves the corresponding bed foot 10, and each decorative sleeve 50 is provided with an inserting hole 51 through which a corresponding fastener 22 can penetrate through.

The reinforcing support frame 60 comprises at least one longitudinal reinforcing bar 61 and at least two transverse reinforcing bars 62, one end of each transverse reinforcing bar 62 is connected to one of the longitudinal support frames 30, and another end of each transverse reinforcing bar 62 is connected to another one of the longitudinal support frames 30; the longitudinal reinforcing bar 61 is connected to all the transverse reinforcing bars 62. The stability of the entire bed frame can be improved by providing the reinforcing support frame 60. In addition, a plurality of vertical bars 70 are disposed at a bottom side of the reinforcing support frame 60, one end of each vertical bar 70 is connected to the reinforcing support frame 60, and another end of each vertical bar 70 is flush with the bottom ends of the bed feet 10. In other words, a bottom side of each vertical bar 70 may also abut against the ground, so as to improve the supporting force of the bed frame.

The cross bars 80 are disposed on the reinforcing support frame 60, and the reinforcing support frame 60 supports the cross bars 80. The cross bars 80 are disposed at equal intervals along a longitudinal direction of the longitudinal support frames 30; one end of each cross bar 80 is connected to one of the longitudinal support frames 30, and another end of each cross bar 80 is connected to another one of the longitudinal support frames 30. In order to facilitate the connection of the cross bars 80, the longitudinal support frames 30 are provided with connection holes 31 corresponding to the cross bars 80 respectively; each of the longitudinal support frames 30 has a tubular structure, two ends of each cross bar 80 are inserted into corresponding connection holes 31. Each end of each cross bar 80 is provided with a limiting part 81, and a positioning groove 82 is formed between the limiting part 81 and a corresponding end of the cross bar 80, each of the connection holes 31 comprises a mounting part 311 for insertion of the limiting part 81 of a corresponding cross bar 80, and a positioning part 312 corresponding to the positioning groove 82 of the corresponding cross bar 80, and the mounting part 311 and the positioning part 312 of each connection hole 31 are in communication with each other; the limiting part 81 of each end of the each cross bar 80 may be inserted into the mounting part 311 of a corresponding connection hole 31, and after the limiting part 81 is completely inserted into the mounting part 311, slide the cross bar 80 laterally so that the positioning groove 82 falls and fits into the positioning part 312. Accordingly, the corresponding end of the cross bars 80 is limited and cannot be separated from the corresponding connection hole 31. In order to further ensure the mounting stability of the cross bars 80, an end cap 32 is detachably connected to the corresponding connection hole 31 (for example, in a snap-fit manner); the end cap 32 can limit the corresponding end of the corresponding cross bar 80, so that the positioning groove 82 will not be separated from the positioning part 312 when the cross bar 80 is subject to force.

The key points of the present invention are that, at least one connection bar piece 21 is provided on each of the first side and the second side of each of the transverse support frames 20, and the connection bar piece 21 is inserted to a corresponding bed foot 10 and is locked by a corresponding fastener 22, so that the transverse support frame 20 is more convenient and faster to assemble and has a better aesthetic appeal. The bed frame can be disassembled into the bed feet 10, the transverse support frames 20 and the longitudinal support frames 30, which facilitates packaging and transportation. In addition, the transverse support frames 20 serving as the headboard and footboard are each provided with a decorative bar 40, and each end of the decorative bar 40 is also locked by the same fastener 22 locking the corresponding bed foot and the corresponding connection bar piece, and this further facilitates the assembly and disassembly of the bed frame.

What is claimed is:

1. A bed frame assembly, comprising four bed feet, two transverse support frames, and two longitudinal support frames; each of the bed feet is connected with one end of one corresponding transverse support frame and one end of one corresponding longitudinal support frame; the bed feet, the transverse support frames and the longitudinal support frames form a bed frame;

wherein at least one connection bar piece is provided to each of a first side and a second side of each of the transverse support frames; said first side and said second side are opposite sides; each of the bed feet is provided with at least one mounting hole each corresponding to a corresponding connection bar piece;

one end of each connection bar piece is connected to a corresponding transverse support frame, and another end of each connection bar piece is inserted into a corresponding mounting hole; said another end of each connection bar piece is provided with a fastener, and the fastener penetrates through a corresponding bed foot and is connected to the connection bar piece;

the bed frame assembly further comprises decorative bars each corresponding to a corresponding transverse support frame; each end of each decorative bar is inserted into the corresponding bed foot; and each end of each decorative bar is recessed with a receding groove to allow a corresponding connection bar piece to pass through, and is also provided with a penetrating hole for the fastener to pass through.

2. The bed frame assembly of claim 1, wherein the fastener is a screw; at least one through hole through which each corresponding screw penetrates is formed on each of the bed feet; the through hole is in communication with a corresponding mounting hole, a screw hole corresponding to a corresponding screw is formed inside each of the two ends of each connection bar piece.

3. The bed frame assembly of claim 1, further comprising decorative sleeves each corresponding to a corresponding connection bar piece; each decorative sleeve sleeves the corresponding bed foot, and each decorative sleeve is provided with an inserting hole through which a corresponding fastener penetrates.

4. The bed frame assembly of claim 1, wherein the decorative bars and the bed feet have a tubular shape, and each end of each decorative bar is reduced in diameter to form an insertion part, and the insertion part is inserted into a tubular cavity of the corresponding bed foot.

5. The bed frame assembly of claim 1, further comprising a reinforcing support frame and a plurality of vertical bars; one end of each vertical bar is connected to the reinforcing support frame, and another end of each vertical bar is flush with bottom ends of the bed feet; the reinforcing support frame comprises at least one longitudinal reinforcing bar and at least two transverse reinforcing bars; one end of each transverse reinforcing bar is connected to one of the longitudinal support frames, and another end of each transverse reinforcing bar is connected to another one of the longitudinal support frames;

the longitudinal reinforcing bar is connected to all the transverse reinforcing bars.

6. The bed frame assembly of claim 1, further comprising a plurality of cross bars; the cross bars are disposed at equal intervals along a longitudinal direction of the longitudinal support frames; one end of each cross bar is connected to one of the longitudinal support frames, and another end of each cross bar is connected to another one of the longitudinal support frames.

7. The bed frame assembly of claim 6, wherein the longitudinal support frames are provided with connection holes corresponding to the cross bars respectively; two ends of each cross bar are inserted into corresponding connection holes; each end of each cross bar is provided with a limiting part, and a positioning groove is formed between the limiting part and a corresponding end of the cross bar; each of the connection holes comprises a mounting part which the limiting part of a corresponding cross bar is inserted into, and a positioning part corresponding to the positioning groove of the corresponding cross bar; the mounting part and the positioning part of each connection hole are in communication with each other.

8. The bed frame assembly of claim 7, wherein an end cap is detachably connected to each connection hole to limit movement of a corresponding end of the corresponding cross bar.

* * * * *